(12) United States Patent
Domprobst

(10) Patent No.: US 12,122,189 B2
(45) Date of Patent: Oct. 22, 2024

(54) TREAD HAVING HIDDEN CAVITIES EXTENDED BY OFFSET OPENINGS

(71) Applicant: COMPAGNIE GENERALE DES ETABLISSEMENTS MICHELIN, Clermont-Ferrand (FR)

(72) Inventor: Frédéric Domprobst, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 532 days.

(21) Appl. No.: 17/414,589

(22) PCT Filed: Dec. 16, 2019

(86) PCT No.: PCT/FR2019/053082
§ 371 (c)(1),
(2) Date: Jun. 16, 2021

(87) PCT Pub. No.: WO2020/128271
PCT Pub. Date: Jun. 25, 2020

(65) Prior Publication Data
US 2022/0055413 A1  Feb. 24, 2022

(30) Foreign Application Priority Data

Dec. 17, 2018  (FR) ........................................ 1873050
Jan. 31, 2019  (FR) ........................................ 1900893

(51) Int. Cl.
*B60C 11/03* (2006.01)
*B60C 11/12* (2006.01)
*B60C 11/13* (2006.01)

(52) U.S. Cl.
CPC ...... *B60C 11/0323* (2013.01); *B60C 11/1281* (2013.01); *B60C 11/1315* (2013.01); *B60C 2200/06* (2013.01)

(58) Field of Classification Search
CPC ............. B60C 11/1281; B60C 11/0323; B60C 2011/1254
See application file for complete search history.

(56) References Cited

U.S. PATENT DOCUMENTS 2,696,863 A * 12/1954 Ewart .................... B60C 11/042
  152/DIG. 3
2009/0165908 A1* 7/2009 Takahashi ............... B60C 11/04
  152/209.18
2022/0185025 A1   6/2022 Voss et al.

FOREIGN PATENT DOCUMENTS

EP   2 323 858       5/2011
JP   H 05-155202    6/1993
(Continued)

*Primary Examiner* — Cedrick S Williams
(74) *Attorney, Agent, or Firm* — Cozen O'Connor

(57) ABSTRACT

Tread for heavy-duty vehicle tire, having tread surface with at least one cavity forming a hidden channel which forms an additional groove after an amount of wear, each channel extended towards tread surface in the new state along its entire length by a sipe of small width, at least one channel having plurality of extensions from this channel towards tread surface to place the channel and the outside of the tread into communication from an amount of partial wear of the tread, each extension being a secondary channel having a first opening of elongate shape with a minimum dimension I0 and a maximum dimension Lo that opens onto tread surface and a second opening that opens into channel, wherein for at least one channel provided with extensions, each first opening of these extensions is formed by a side of the sipe that extends the channel.

10 Claims, 3 Drawing Sheets

(56) References Cited

FOREIGN PATENT DOCUMENTS

| | | | |
|---|---|---|---|
| JP | 2008/168872 | | 7/2008 |
| JP | 2008273301 A | * | 11/2008 |
| WO | WO 2013/083610 | | 6/2013 |
| WO | WO 2016/191443 | | 12/2016 |
| WO | WO 2017/176280 | | 10/2017 |
| WO | WO 2018/158546 | | 9/2018 |
| WO | WO 2022/204942 | | 10/2022 |

* cited by examiner

TREAD HAVING HIDDEN CAVITIES EXTENDED BY OFFSET OPENINGS

RELATED APPLICATIONS

This is a U.S. National Phase Application under 35 USC 371 of International Application PCT/FR2019/053082 filed on Dec. 16, 2019.

This application claims the priority of French application nos. FR 18/73050 filed Dec. 17, 2018 and FR 19/00893 filed Jan. 31, 2019, the entire content of all of which are hereby incorporated by reference.

FIELD OF THE INVENTION

The invention relates to treads for heavy-duty vehicle tires, and more particularly to the arrangements of voids with which these treads are provided, for which the running performance in times of wet weather is made more durable.

Definitions

A cut means any cavity or void produced in particular by moulding in a tread for a tire, this cut extending both into the depth of the tread and in a main direction—which is the direction in which water flows in the cut when running in times of wet weather.

An open groove means a cut that opens onto a tread surface of a tread that comes into contact with the road surface, this groove being delimited by facing walls, the mean distance between these walls being appropriate for these walls not to be in contact with one another under normal use conditions of the tire.

A sipe means a thin cut having a small mean width, this mean width corresponding to the mean distance between the facing walls that delimit it, and such that, under normal use conditions of the tire, these walls can come, at least partially, into contact with one another when in the contact patch in contact with the road surface.

A hidden cavity or channel means a cavity that is formed under the tread surface in the new state of the tread, this cavity being intended to form a new groove that opens onto the new tread surface created after a predetermined amount of partial wear. A hidden cavity is delimited by two facing lateral walls, these two lateral walls being connected to one another by a lower part forming a bottom and by an upper part that continues these walls radially towards the outside. A sipe may open into this upper part to connect the hidden cavity to the tread surface in the new state. Viewed in cross section, a hidden cavity may adopt any geometric shape, for example: circular, rectangular, triangular. The main direction of a hidden channel is defined as the direction in which the water flows when running on a road surface covered in water.

The thickness of tread material to be worn away means the thickness of this tread material that can be worn away during running before the legal tread wear limit is reached, this limit being able to be identified by tread-wear indicators formed in particular in the grooves. When this limit has been reached, intervention is necessary in order to reform a new design of voids on the tread of the tire, to fit a new tread or to change the tire.

In the present description, the terms radial or radially are used to indicate a direction which, when considered on the tire, is a direction perpendicular to the axis of rotation of the tire whereas, when considered on a tread alone, it corresponds to the direction of the thickness of said tread.

Moreover, the term circumferential is used to indicate a direction which corresponds to a direction tangential to any circle centred on the axis of rotation of the tire. This circumferential direction corresponds to the longitudinal direction of the tread, the latter being formed in the manner of a flat strip before it is incorporated into the manufacture of a new tire or into the retreading thereof.

The term transverse refers to a direction that is parallel to the direction of the axis of rotation of the tire. This direction is perpendicular to the radial direction and to the circumferential direction. A direction is said to be oblique when it forms an angle greater than zero with the circumferential or longitudinal direction.

BACKGROUND OF THE INVENTION

As is known, wet-weather driving conditions require the most rapid possible elimination of the water between the tread of each tire and the road surface so as to ensure that the tread makes contact with the road surface. The water which is not pushed ahead of or to the sides of the tire partially flows in grooves formed in the tread of the tire, these grooves opening onto the tread surface in the new state.

These grooves can be oriented in the circumferential direction or the transverse direction or in an oblique direction that is somewhere between the previous two directions, or in a combination of these directions.

Whatever the tire category, the tread of this tire needs to afford a performance level in terms of drainage of water on the road that is always above a minimum performance level known as the safe performance. Accordingly, and given that the tread gradually wears away, progressively reducing the cross-sectional areas of the grooves and consequently the ability of these grooves to remove a given quantity of liquid, it is commonplace to produce grooves that open onto the tread surface in the new state and continue into the thickness of the tread down to at least a level that corresponds to a legal wear limit requiring the tread to be withdrawn.

The disadvantage of creating such a plurality of grooves that open onto the tread surface of a tread is that it reduces the amount of material for a given width of tread and consequently appreciably reduces the stiffness of the tread, this having an impact on the wearing performance. As a result, in order to address the loadings experienced by the tread during running, a person skilled in the art needs to compensate for these reductions in stiffness by any means at their disposal, notably by adapting the internal structure of the tire, something that is, of course, not without its own impact on the manufacturing cost of the tire itself. These reductions in stiffness can also adversely affect the wear rate, the evenness of this wear, and some of the expected performance aspects during running.

Furthermore, an increase in the rolling resistance is observed, which is connected with the cycles of greater deformation of elastomer materials that form the tread, this manifesting itself in an appreciable increase in the energy consumption of the vehicles fitted with such tires.

In order to at least partially solve such a problem, the document EP 2323858-B1 proposes forming hidden cavities entirely under the tread surface of the tread in the new state, each hidden cavity being continued towards the tread surface of the tread in the new state by a sipe of appropriate geometry for promoting greater stiffness. With this type of tire, it is possible, as required, to renew a greater or lesser proportion of the initial drainage volume once the tread has reached a predetermined level of wear.

Similarly, it has been proposed, in the publication WO 2016191443-A1, to extend the hidden cavities with wells that open both into a hidden cavity and onto the tread surface of the tread in the new state.

It is known to combine the presence of grooves that open onto the tread surface in the new state and the presence of hidden cavities that form additional grooves after partial wear of the tread. These additional grooves at least partially make up for the loss of volume of the grooves initially open onto the tread surface in the new state, this loss being associated with the wearing of the tread.

Although these provisions are favourable from a standpoint of balancing performance aspects, it has been found that certain running performance aspects are in need of further improvement. This is the case with respect to the traction performance of the tire, where it is necessary to have on the tread thereof edge corners of material that are oriented obliquely or transversely, these edge corners being active in the contact patch in contact with the road surface during running.

It is possible to add to the provisions recalled above the presence of obliquely or transversely oriented grooves; however, although this addition does create new oblique or transverse edge corners, it causes a reduction in the stiffness of the tread in the new state.

SUMMARY OF THE INVENTION

The present invention relates to a solution to this problem of increasing the length of oblique or transverse edge corners while preserving a good level of overall stiffness of a tire tread provided with hidden cavities.

To this end, one subject of the invention is a tread for a heavy-duty vehicle tire having a total thickness E corresponding to the total thickness of material to be worn away during running. This tread has, in the new state, a tread surface intended to come into contact with a road surface when a tire provided with this tread is running. This tread surface is renewed progressively with the wear caused by running on the road surface.

This Tread Comprises:
- at least one cavity forming a hidden channel intended to form an additional groove after a predetermined amount of partial wear corresponding to a thickness Lu, this hidden channel having a length measured in its main direction and a height Hc, this hidden channel being delimited by two facing lateral walls, these two lateral walls, which are spaced apart by a width Lc, being connected together by a lower part forming a bottom and by an upper part that continues these walls radially towards the outside,
- each hidden channel being extended towards the tread surface in the new state and along its entire length by a sipe of small width that opens into the upper part of said channel,
- at least one hidden channel having a plurality of extensions that extend from this hidden channel towards the tread surface so as to place the channel and the outside of the tread into communication at least starting from an amount of partial wear of the tread,
- each extension being a secondary channel having two openings, a first opening at or close to the tread surface of elongate shape with a minimum dimension I0 and a maximum dimension Lo, and a second opening that opens into the hidden channel, this tread being characterized in that, for at least one hidden channel provided with extensions, each first opening of these extensions is formed entirely by a side of the sipe that extends said hidden channel.

By virtue of this provision, it is possible to keep the stiffness of the tread in the new state at a relatively high level while benefiting from the presence of edge corners that are oriented transversely or obliquely (with respect to the direction of the hidden channels that are oriented preferably in a longitudinal or circumferential direction), the latter being formed by the edge corners of the openings onto the tread surface of the extensions that extend the hidden channels. Each extension extending a hidden channel opens, on one side, onto or in the vicinity of the tread surface, by a first opening, and, on the other side, into the hidden channel, by a second opening, forming a secondary channel, having a significant cross section. In other words, an extension, within the meaning of the invention, is not a sipe. Consequently, the walls of an extension cannot come into contact with one another, even partially, when the tread enters the contact patch in contact with the road surface, under normal running conditions of the tire. Therefore, such an extension necessarily always remains open, while the tire is running, and allows the water to circulate if necessary. Moreover, each first opening of an extension, which opens onto or in the vicinity of the tread surface, has en elongate shape, characterized by a maximum dimension L0 and a minimum dimension I0 corresponding respectively to the length and the width of the smallest rectangle in which said first opening is inscribed. In the field of heavy-duty vehicle tires, a first opening typically has a minimum dimension I0 at least equal to 3 mm and a maximum dimension L0 at least equal to 10 mm and at most equal to 100 mm. The orientation of the maximum dimension L0 is generally transverse or oblique, in order to obtain the greatest possible length of transverse or oblique edge corner, this ensuring an optimal contribution of the first opening to longitudinal grip. Lastly, the first opening of an extension may be transversely positioned either in contact with the sipe extending the hidden channel or at a distance from said sipe.

According to one embodiment, the first opening of an extension can open onto the tread surface in the new state allowing water drainage from the very start of use of the tire. In another variant, this first opening may be offset by a small distance towards the inside of the tread and only appear at the tread surface after a predetermined amount of partial wear of the tread, thereby affording the possibility of having greater rigidity in the new state. In this other variant, each extension is generally extended towards the tread surface by a sipe of small width, this sipe being connected to the sipe that extends the hidden channel.

According to one variant of the invention, the first openings of the extensions are offset transversely with respect to the sipe that extends the hidden channel, a complementary sipe of small width connecting each extension to the tread surface, this complementary sipe also being connected to the sipe that extends the hidden channel. It should be noted that the first opening of an extension has a smallest dimension or width that is significantly greater than the width of the complementary sipe.

Advantageously, all the first openings of the extensions of one and the same hidden channel are formed on one and the same side with respect to the sipe that extends said channel towards the tread surface.

Advantageously, the second opening of each extension opens at least partially onto one of the lateral walls delimiting a hidden channel, making it possible to maintain the presence of transverse or oblique edge corners even after the appearance of additional grooves during the opening of the hidden channels after wear.

Advantageously, all the extensions of one and the same hidden channel have their first openings located between the sipe that extends a hidden channel towards the tread surface and one of the external edges of the tread in order to allow the drainage of this edge.

In one embodiment, the first openings of the extensions of one and the same hidden channel are formed on one and the same side with respect to the sipe that extends the hidden channel and they are also offset transversely with respect to one another.

In another embodiment, the first openings of the extensions are oriented so as to make an angle A of between 20 degrees and 70 degrees with the main direction of the hidden channel to which these extensions are connected.

In another preferred embodiment, the tread is appropriate for conferring a preferred direction of rotation on the tire provided with this tread. This preferred direction is generally indicated on the tread or on the tire by a visual element or a marking such as an arrow, for example. In this specific embodiment, the first openings of the extensions that place a hidden channel into communication with the outside are advantageously all oriented so as to promote the flow of the water present on a road surface towards the inside of the tread. Specifically, these first openings are oriented such that the part of each first opening that is furthest away from the sipe that extends the hidden channel is the first to come into contact with the road surface.

Advantageously, the first openings of the extensions have elongate geometries at the tread surface, meaning that the ratio between the dimension I0 and the maximum dimension L0 thereof is between ½ and ⅕. For usual heavy-duty vehicle tires, the maximum dimension of the first openings is at least equal to 10 mm and at most equal to 100 mm, and their minimum dimension I0 is at least equal to 3 mm.

That which has been stated for hidden channels provided with extensions that open onto the tread surface may apply either to the case in which these extensions open onto the tread surface in the new state or to the case in which these extensions only open after partial wear.

According to one variant of the invention, the tread comprises at least one hidden channel having a plurality of extensions, this hidden channel extending in the longitudinal direction of the tread (this direction corresponds to the circumferential direction when the tread equips a tire).

The invention also relates to a tire for a heavy-duty vehicle, this tire being equipped with a tread as described above.

Further features and advantages of the invention will become apparent from the following description given with reference to the appended drawings, which show, by way of non-limiting examples, embodiments of the subject matter of the invention.

DETAILED DESCRIPTION OF THE DRAWINGS

To make the figures easier to understand, identical reference signs have been used to describe variants of the invention where these signs refer to elements of the same kind, whether in terms of structure or function.

Figure 1:
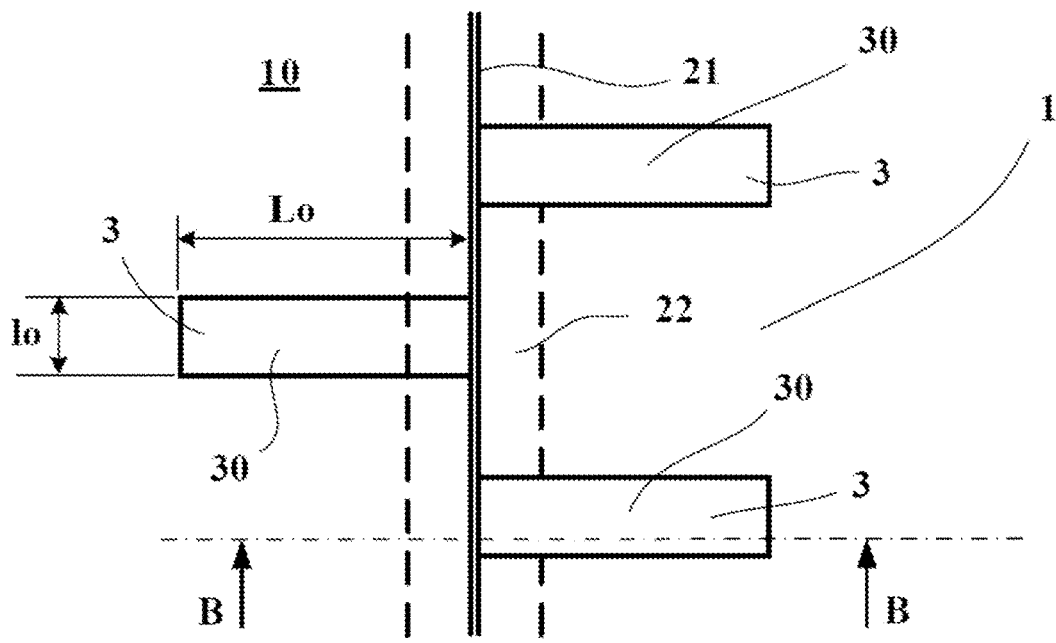
FIG. 1 shows a first variant of the disposition of the openings formed by the extensions opening onto a longitudinal hidden channel entirely inside a tread.

FIG. 1 shows a first variant of the invention. In this first variant, a tread 1 for a heavy-duty vehicle tire comprises a tread surface 10 and, opening onto this tread surface, cuts including at least one sipe 21 that is oriented longitudinally (circumferentially on the tire provided with this tread). This longitudinal sipe 21 opens at its other end into a hidden channel 22 that is oriented longitudinally. This hidden channel 22 is formed entirely inside the tread and is intended to form, after a predetermined amount of partial wear, a new groove that opens onto the tread surface. It is thus possible to adapt, by limiting it, the volume of voids in the tread in the new state in order to better manage the reduction in stiffness associated with the presence of these voids. The longitudinal sipe 21 has a suitable width to be able to close when in the contact patch in contact with a road surface, meaning that the walls delimiting said sipe can come at least partially into contact with one another and thus isolate the channel 22 from the outside.

Figure 2:
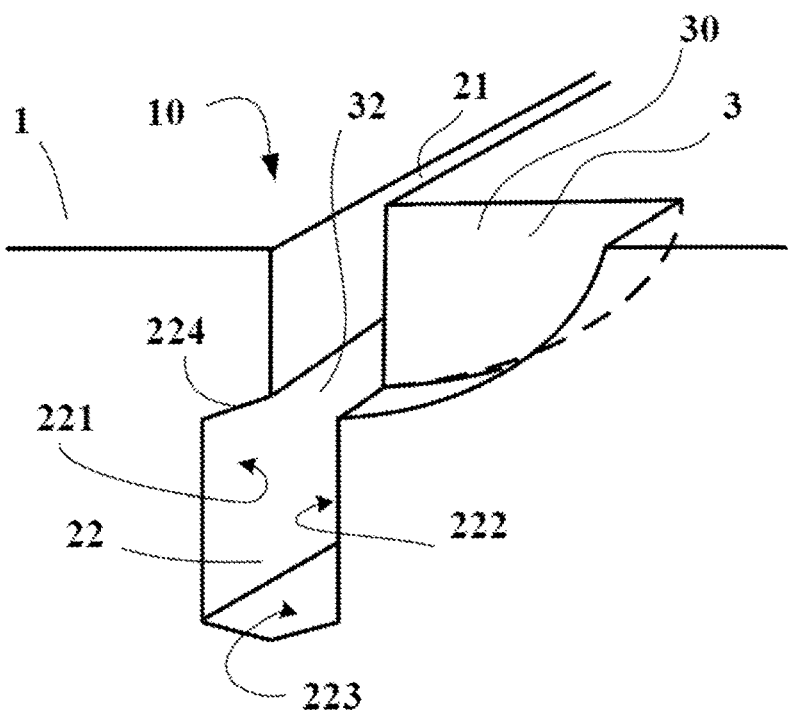
FIG. 2 shows a cross-sectional view (B-B in FIG. 1) of the first variant in the new state.

Furthermore, and as can be seen in FIG. 2, which shows a cross-sectional view of this first variant in the new state, the hidden channel 22 is delimited by facing walls 221, 222, these walls being connected both in their lower part forming the bottom 223 of the channel 22 and in their upper part 224 (close to the tread surface 10). It is into this upper part 224 of the channel 22 that the sipe 21 opens.

According to this first variant, a plurality of extensions 3 having a first opening 30 that opens onto the tread surface 10 in the new state are also formed. These extensions 3 have a second opening 32 that opens into the sipe 21 and into the upper part 224 of the hidden channel 22. Each extension 3 extends entirely on one and the same side with respect to the sipe 21; the extensions 3 are disposed alternately on each side of the sipe 21. The first opening 30 of each extension 3 onto the tread surface in the new state has a rectangular geometry of length Lo and width lo, the length Lo being oriented transversely to the tread. These widths lo and length Lo are in a ratio of 1 to 5 in the example described.

The extensions 3 thus allow the drainage in the new state of the tread surface towards the hidden channel 22 and their offset with respect to the longitudinal sipe 21 surmounting the hidden channel 22 creates transversely oriented edge corners favourable for achieving performance in terms of traction and braking. Furthermore, the contour of these first openings 30 onto the tread surface changes as the tread becomes worn, this being favourable to preventing the occurrence of uneven wear. In this variant, the first opening 30 of each extension 3 has a surface area that decreases progressively with wear.

Figure 3:
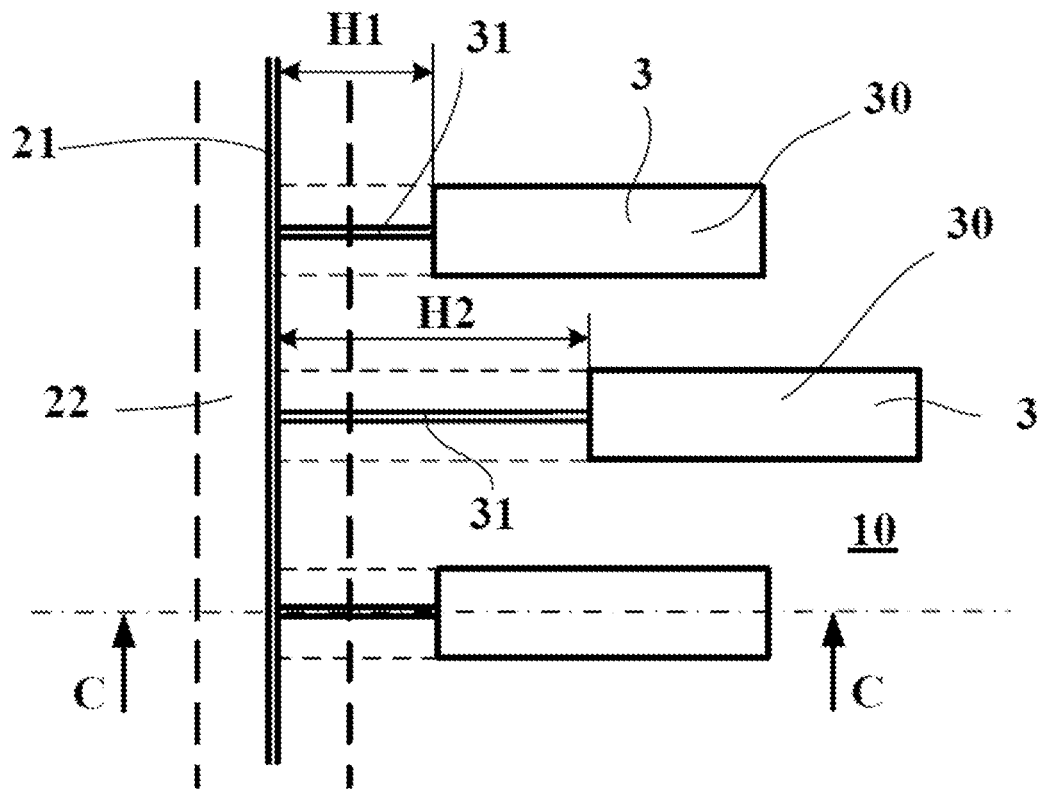
FIG. 3 shows a second variant of the disposition of the openings formed by the extensions opening onto a hidden channel.

FIG. 3 shows a second variant of the invention, in which the first openings 30 of the extensions 3 that open onto a hidden channel 22 are all positioned on one and the same side with respect to the sipe 21 surmounting the hidden channel 22. Moreover, the first openings 30 are positioned in the new state and transversely at different distances H1, H2 with respect to the sipe 21 surmounting the hidden channel 22. By combining this disposition with a longitudinal spacing between the extensions 3 (spacing measured in the main direction of the hidden channel), it is possible to increase the effectiveness of drainage between the tread and the road surface. The side on which the first openings 30 are positioned may preferably be chosen as being the side closest to one of the lateral edges of the tread.

Figure 4:
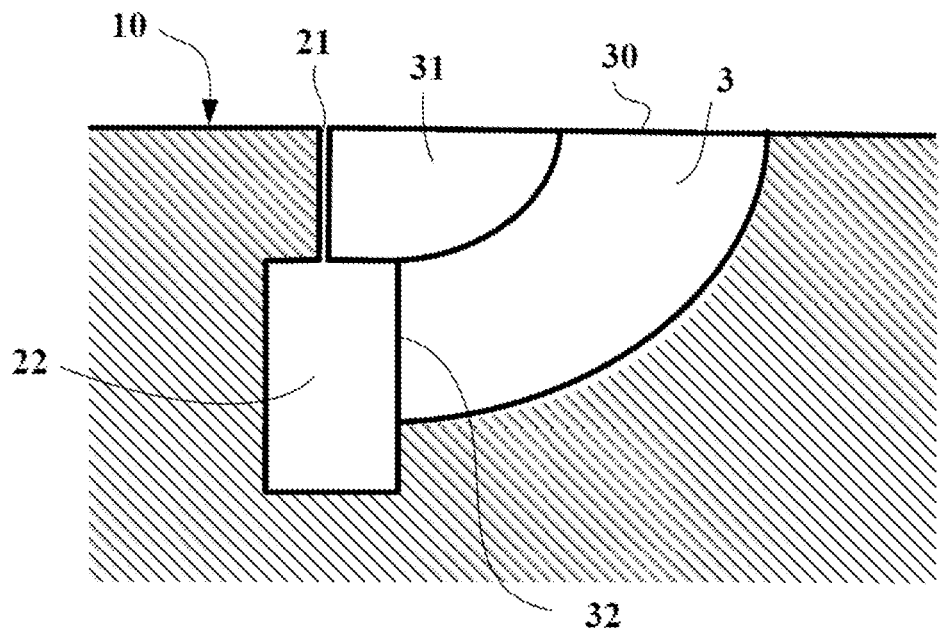
FIG. 4 shows a cross section through the tread (C-C in FIG. 3) according to the second variant.

FIG. 4 shows a cross section through the tread of this second variant. It is apparent from this FIG. 4 that the extension 3 comprises a second opening 32 that opens into one of the lateral walls delimiting the hidden channel 22. By virtue of this disposition, it is possible to maintain a length of transverse edge corners even after the hidden channel has become an additional groove.

Figure 5:
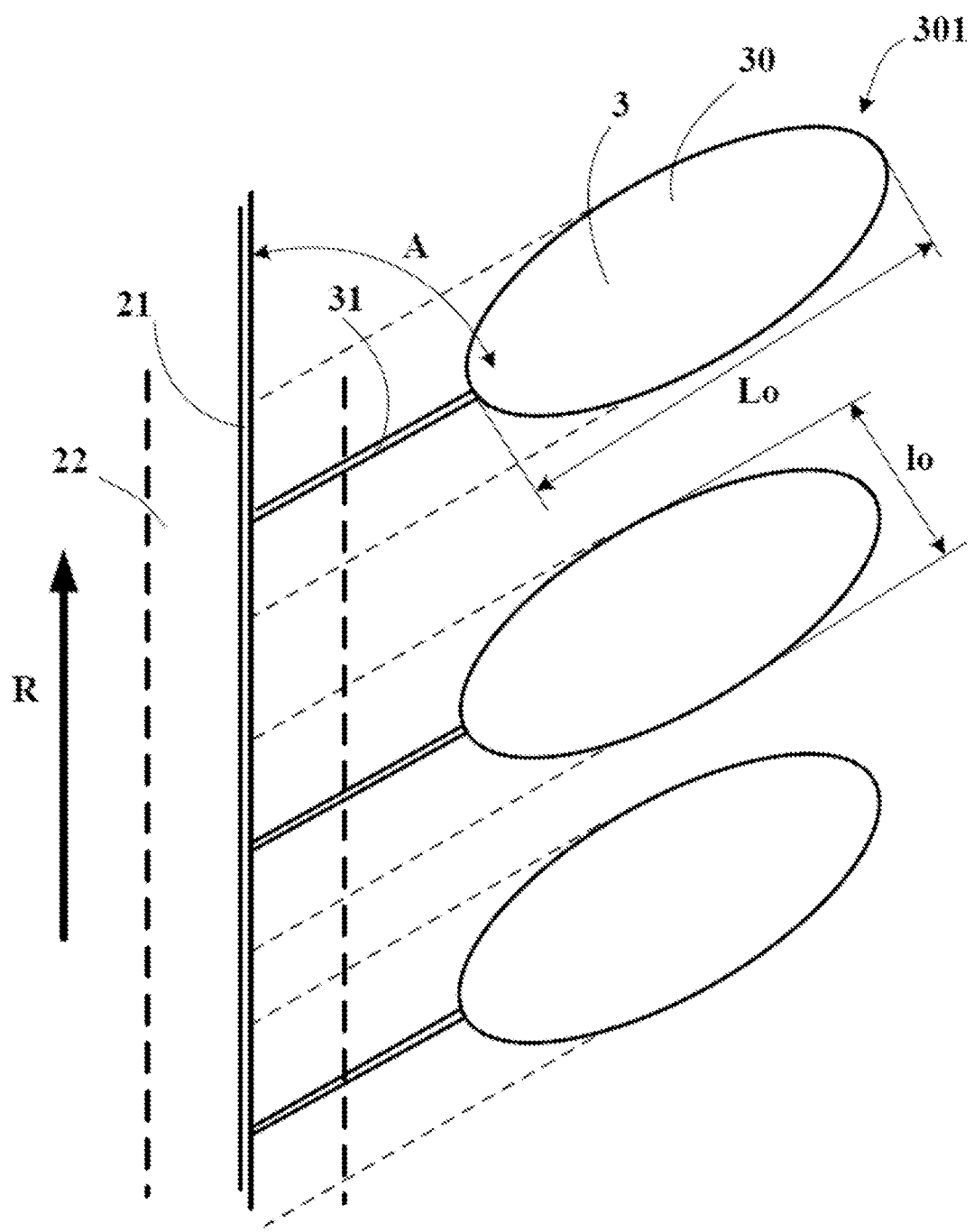
FIG. 5 shows a third variant of the disposition of the openings formed by the extensions opening onto a hidden channel.

FIG. 5 shows a third variant of the disposition of the first openings 30 of the extensions 3 opening into a longitudinally oriented hidden channel 22 in a tread. In this third variant, the tread is designed to impose a direction of rotation on the tire (indicated by an arrow R in the figure). This preferred direction of rotation is, as a general rule, indicated on the tire by a specific visible sign. In such a case, it is advantageous to orient the first openings 30 of the extensions 3 so as to make best use of this preferred direction of rotation. The case described shows first openings 30 of elongate shape, the largest of the dimensions of which, denoted Lo, makes an angle A with the longitudinal direction followed by the hidden channel 22 and the sipe 21 extending it as far as the tread surface. The additional sipes 31 formed between the longitudinal sipe 21 and each extension 3 are oriented at the same angle A.

Moreover, this angle A is such that, during running, it is the part 301 of the first opening 30 of each extension 3 that is furthest away from the longitudinal sipe 21 that is the first to come into contact with the road surface. This disposition further improves drainage between the road surface and the inside of the hidden channel.

Of course, the different variants described can be combined with one another. Furthermore, the examples described can be transposed to the case in which the openings of the extensions appear at the tread surface only after a limited amount of partial wear.

The invention is not limited to the examples presented and various modifications can be made thereto without departing from its scope as defined in the claims. In particular, the description given in respect of hidden cavities with a longitudinal main orientation (circumferential on the tire) could be applied to any other orientation, and in particular to a transverse or oblique orientation. In the same way, it is possible to combine circumferentially oriented hidden channels and transversely oriented hidden channels, these two types of channels each having a plurality of extensions that place these channels into communication with the outside in the new state or after partial wear.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A tread for a heavy-duty vehicle tire, having a tread surface in a new state that is intended to come into contact with a road surface when a tire provided with this tread is running, this tread comprising:

at least one cavity forming a hidden channel intended to form an additional groove after a predetermined amount of partial wear, this hidden channel being delimited by two facing lateral walls, these two lateral walls being connected together by a lower part forming a bottom and by an upper part, each hidden channel being extended towards the tread surface in the new state and along its entire length by a sipe of small width that opens into the upper part of said channel, at least one hidden channel having a plurality of extensions that extend from this hidden channel towards the tread surface so as to place the hidden channel and the outside of the tread into communication at least starting from an amount of partial wear of the tread, each extension being a secondary channel having two openings, a first opening at or close to the tread surface of elongate shape with a minimum dimension I0 and a maximum dimension Lo, and a second opening that opens into the hidden channel, wherein for at least one hidden channel provided with extensions, each first opening of these extensions is formed entirely by a side of the sipe that extends said hidden channel, wherein the plurality of extensions that extend from this hidden channel towards the tread surface are arcuate so as to be curved over their entire extent, wherein the first openings are offset transversely with respect to one another in an axial direction from the side of the sipe that extends said hidden channel, wherein all the first openings of the extensions of one and the same hidden channel are formed on one and the same side with respect to the sipe that extends said channel towards the tread surface, and wherein all of the first openings within parallel sipes are positioned on the same side as each other with respect to the sipe.

2. The tread according to claim 1, wherein the first openings are offset transversely with respect to the sipe that extends the hidden channel, a complementary sipe of small width connecting each extension to the tread surface, this complementary sipe also being connected to the sipe that extends the hidden channel.

3. The tread according to claim 1, wherein the second opening of each extension opens at least partially onto one of the lateral walls delimiting a hidden channel.

4. The tread according to claim 1, wherein the first openings of the extensions are oriented so as to make an angle A of between 20 degrees and 70 degrees-with-the main direction of the hidden channel to which these extensions are connected, wherein angle A is configured such that the first opening will not come into contact with a parallel sipe.

5. The tread according to claim 1, conferring a preferred direction of rotation on the tire provided with this tread, wherein the first openings of the extensions that place a hidden channel into communication with the outside are all oriented such that the part of each first opening that is furthest away from the sipe that extends the hidden channel is the first to come into contact with the road surface.

6. The tread according to claim 1, wherein the first openings of the extensions have elongate geometries at the tread surface, meaning that a ratio between the minimum dimension I0 and the maximum dimension LO thereof is between ½ and ¹⁄₁₅.

7. The tread according to claim 1, wherein the first openings of the extensions only open onto the tread surface of the tread after this tread has become partially worn.

8. The tread according to claim 1, wherein at least one hidden channel having a plurality of extensions extends in a longitudinal direction of the tread.

9. A tire for a heavy-duty vehicle provided with a tread according to claim 1.

10. The tread according to claim 1, wherein a lower edge of the second opening is radially spaced from a bottom of the at least one hidden channel.

\* \* \* \* \*